3,255,201
2-NITROIMIDAZOLES

Alden Gamaliel Beaman, North Caldwell, and Robert Duschinsky, Essex Fells, N.J., and William Paul Tautz, New York, N.Y., assignors to Hoffmann-La Roche Inc., Nutley, N.J., a corporation of New Jersey
No Drawing. Filed Apr. 9, 1965, Ser. No. 447,104
6 Claims. (Cl. 260—309)

The present invention relates to 1-substituted 2-nitroimidazoles and more particularly relates to 2-nitroimidazoles of the formula

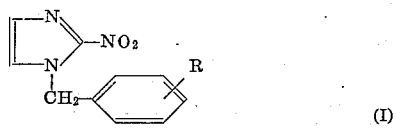

wherein R is nitro or halogen, e.g., chlorine, bromine, or fluorine. Preferred compounds are those wherein R is in the para-position.

The compounds of Formula I are prepared by reacting 2-nitroimidazole with a halo- or nitro-substituted benzyl chloride at a temperature in the range of from about 70° to about 100° in the presence of a strong base, e.g., an alkali metal lower alkoxide in a lower alkanol solvent, e.g., sodium ethoxide.

The novel compounds of Formula I and their acid addition salts with pharmaceutically acceptable acids are active against bacteria, pathogenic yeasts and protozoa, and are useful as germicides, antiprotozoal agents, and as agents for the treatment of pathogenic yeast infections, e.g., *Trichomonas vaginalis*, *Histomonas malegradis*, etc. They can be administered orally, parenterally, topically, or in suppository form, e.g., in combination with the usual pharmaceutical adjuvants. Topical oral dosage ranges from about 20 to about 200 mg./kg. animal body weight with dosage adjusted to species and individual requirements.

The preferred compound of Formula I for use in the practice of the invention is 1-(p-nitrobenzyl)-2-nitroimidazole, which is characterized by a very high order of antitrichomonal activity, e.g., against *Trichomonas vaginalis*.

Typical pharmaceutical formulations are given below:

TABLET FORMULATION

| | Mg. per tablet |
|---|---|
| Compound of Formula I | 50.0 |
| Lactose | 118.5 |
| Corn starch | 70.5 |
| Pregelatinized corn starch | 8.0 |
| Calcium stearate | 3.0 |
| Total weight | 250.0 |

Precedure (1) The compound of Formula I, lactose, corn starch, and pregelatinized corn starch were mixed in a suitable size mixer.

(2) The mix was passed through a Fitzpatrick Comminuting Machine fitted with No. 1A screen and with knives forward.

(3) The mix was then returned to the mixer and moistened with water to a thick paste. The moist mass was passed through a No. 12 screen, and the moist granules were dried on paper lined trays at 110° F.

(4) The dried granules were returned to the mixer, the calcium stearate was added and mixed well.

(5) The granules were compressed at a tablet weight of 250 mg., using standard concave punches having a diameter of 5/16".

CAPSULE FORMULATION

| | Mg. per capsule |
|---|---|
| Compound of Formula I | 50 |
| Lactose | 118 |
| Corn starch | 37 |
| Talc | 5 |
| Total weight | 210 |

Procedure (1) The compound of Formula I, lactose, and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly. The mixture was filled into No. 4 hard shell gelatin capsules on a capsulating machine.

SUPPOSITORY FORMULATION

| | Gm. per 1.3 gm. Suppository |
|---|---|
| Compound of Formula I | 0.050 |
| Refined cocoa butter—coconut derived | 1.205 |
| Carnauba wax | 0.045 |

Procedure (1) The cocoa butter and the carnauba wax were melted in a suitable size glass lined container, mixed well and cooled to 45° C.

(2) The compound of Formula I, which had been reduced to a fine powder with no lumps, was added and stirred until completely and uniformly dispersed.

(3) The mixture was poured into suppository molds to yield suppositories having an individual weight of 1.3 gm.

(4) The suppositories were removed from molds and cooled. They were individually wrapped in wax paper for packaging.

PARENTERAL FORMULATION

| | Per cc. |
|---|---|
| Compound of Formula I, mg. | 5.1 |
| Propylene glycol, cc. | 0.4 |
| Benzyl alcohol (benzaldehyde free), cc. | 0.015 |
| Ethanol (anhydrous), cc. | 0.10 |
| Sodium benzoate, mg. | 48.8 |
| Benzoic acid, mg. | 1.2 |
| Water for injection, cc., q.s. | 1.0 |

Procedure (for 10,000 cc.)

(1) The 51 gm. of the compound of Formula I were dissolved in 150 cc. of benzyl alcohol; 4,000 cc. of propylene glycol and 1,000 cc. of ethanol were added.

(2) The 12 gm. of benzoic acid were dissolved in the above. The 488 gm. of sodium benzoate dissolved in 3,000 cc. of water for injection were added. The solution was brought up to final volume of 10,000 cc. with water for injection.

(3) The solution was filtered through an 02 Selas candle, filled into suitable size ampuls, gassed with $N_2$ and sealed. It was then autoclaved at 10 p.s.i. for 30 minutes.

TOPICAL CREAM

|  | Gm. per 100 gm. cream |
|---|---|
| Compound of Formula I | 5.1 |
| Stearic acid | 15.0 |
| Mineral oil, light | 1.5 |
| Sorbitan monostearate | 2.5 |
| Methyl p-hydroxybenzoate | 0.08 |
| Propyl p-hydroxybenzoate | 0.02 |
| Sorbitol solution N.F. | 5.00 |
| Polyoxyethylene sorbitan monostearate | 1.69 |
| Distilled water | 72.5 |

Procedure (1) The stearic acid, mineral oil, sorbitan monostearate and methyl and propyl p-hydroxybenzoates were melted together at approximately 75° C. in a suitable size stainless steel-jacketed kettle with agitator.

(2) A suspension of the compound of Formula I in a solution of polyoxyethylene sorbitan monostearate, sorbitol N.F. and distilled water was added to the melted mixture.

(3) The mixture was stirred at 75° C. until uniform, and the temperature was gradually reduced with continuous stirring.

(4) When the temperature reached 48° C., the cream was transferred to storage containers.

(5) The cream was packaged in wax lined, tin tubes (opal glass jars may also be used).

The invention will be better understood by referring to the following examples which are given for illustration purposes only and are not meant to limit the invention.

*Example 1.—Preparation of 1-(p-nitrobenzyl)-2-nitroimidazole*

Sodium (1.12 g., 48.7 mg. atoms) was dissolved in 100 ml. of absolute ethanol, and 5.0 g. (4.42 mmoles) of sublimed 2-nitroimidazole was dissolved in this solution. Then 7.97 g. (46.4 mmoles) of p-nitrobenzylchloride was added and the mixture was refluxed for 13 hours. A solid formed in the reaction mixture. The whole was evaporated to dryness in vacuo, and the solid was shaken for 10 minutes with 40 ml. of 0.25 N NaOH solution, filtered and washed with distilled water. This solid was boiled with 300 ml. of absolute ethanol, the solution filtered, and the filtrate boiled down to 100 ml. and cooled. The solid which formed was then recrystallized from 180 ml. of ethanol and finally from 25 ml. of ethylacetate to give 3.23 g. (34 percent) of light yellow solid, 1-(p-nitrobenzyl)-2-nitroimidazole, melting point 130.5–132°.

*Example 2.—Preparation of 1-(p-chlorobenzyl)-2-nitroimidazole*

Sodium (1.12 g.) was dissolved in 100 ml. of absolute ethanol, and 5.0 g. of sublimed 2-nitroimidazole was dissolved in this solution. Then 7.47 g. of p-chlorobenzylchloride was added and the mixture was refluxed for 13 hours. A solid formed in the reaction mixture. The whole was evaporated to dryness in vacuo, and the solid was shaken for 10 minutes with 40 ml. of 0.25 N NaOH solution, filtered, washed with distilled water, and dried. It was then recrystallized from 40–50 ml. of CCl₄ and finally from 20–25 ml. of absolute ethanol to give 4.85 g. of off-white crystals of 1-(p-chlorobenzyl)-2-nitroimidazole, melting point 108–109.5°.

*Example 3.—Preparation of 1-(m-nitrobenzyl)-2-nitroimidazole*

5 g. of sublimed 2-nitroimidazole was dissolved in a solution of 1.12 g. of sodium in 11 ml. of methanol. The solution was concentrated in vacuo to a red syrup which was dissolved in 50 ml. of absolute ethanol and reevaporated. The resulting red syrup was dissolved in 100 ml. of absolute ethanol and 10.02 g. of m-nitrobenzylbromide was added and the mixture refluxed for 16 hours.

The mixture was evaporated to dryness in vacuo and the resulting yellow solid was slurried with 50 ml. of 0.2 N NaOH solution and filtered (removes 3.5 mmoles of unreacted azomycin). The solid was recrystallized from 125 ml. of absolute ethanol to give 8.06 g. of crystals of 1-(m-nitrobenzyl)-2-nitroimidazole, melting point 109–110.5°. These were crystallized from 110 ml. of absolute ethanol to give 6.06 g. of crystals, melting point 115–116.5°.

*Example 4.—Preparation of 1-(o-nitrobenzyl)-2-nitroimidazole*

5 g. of sublimed 2-nitroimidazole was dissolved in a solution of 1.12 g. of sodium in 11 ml. of methanol. The solution was evaporated in vacuo to a red syrup which was dissolved in 50 ml. of absolute ethanol and reevaporated. The resulting red syrup was dissolved in 100 ml. of absolute ethanol and 7.97 g. of o-nitrobenzylchloride was added and the solution was refluxed for 16 hours. The solution was evaporated to dryness in vacuo. The resulting solid was slurried in 50 ml. of 0.2 N NaOH solution, filtered and washed with distilled water (6.2 mmoles of unreacted azomycin was removed) and dried. The solid was recrystallized from absolute ethanol and then twice from ethyl acetate to give 3.01 g. of crystals of 1-(o-nitrobenzyl)-2-nitroimidazole, melting point 175.5–177°.

*Example 5.—Preparation of 1-(p-fluorobenzyl)-2-nitroimidazole*

5 g. of sublimed 2-nitroimidazole was dissolved in 10.4 ml. of 4.44 N NaOCH₃ in CH₃OH and concentrated to a red oil in vacuo. The oil was dissolved in about 50 ml. of absolute ethanol and the ethanol removed in vacuo and this operation repeated. The red oil was dissolved in 100 ml. of absolute ethanol, 6 ml. (7.5 g.) of p-fluorobenzylchloride was added, and the solution refluxed overnight (16.5 hours). The solution was evaporated to dryness in vacuo and the solid was extracted with 100 ml. of warm ethyl acetate and filtered. The ethyl acetate was extracted with 4 times 30 ml. of 0.1 N NaOH solution and then with 3 times 30 ml. of distilled water. The ethyl acetate was dried over anhydrous MgSO₄ and evaporated in vacuo to a solid. This was crystallized from 40 ml. CCl₄ to give 6.58 g. of crystals of 1-(p-fluorobenzyl)-2-nitroimidazole, melting point 91.5–93°.

We claim:

1. A compound of the formula

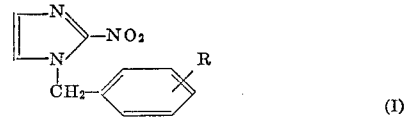

(I)

wherein R is selected from the group consisting of nitro and halogen.

2. 1-(p-nitrobenzyl)-2-nitroimidazole.
3. 1-(m-nitrobenzyl)-2-nitroimidazole.
4. 1-(o-nitrobenzyl)-2-nitroimidazole.
5. 1-(p-chlorobenzyl)-2-nitroimidazole.
6. 1-(p-fluorobenzyl)-2-nitroimidazole.

No references cited.

WALTER A. MODANCE, *Primary Examiner.*

NATALIE TROUSOF, *Assistant Examiner.*